United States Patent
Hansen

(10) Patent No.: US 6,344,704 B1
(45) Date of Patent: Feb. 5, 2002

(54) ELECTRICAL MINIATURE MOTOR

(75) Inventor: Kaj Børge Hansen, Horsens (DK)

(73) Assignee: Kirk Acoustics A/S, Horsens (DK)

( * ) Notice: Subject to any disclaimer, the term of this patent is extended or adjusted under 35 U.S.C. 154(b) by 0 days.

(21) Appl. No.: 09/623,155

(22) PCT Filed: Jun. 11, 1999

(86) PCT No.: PCT/DK99/00321

§ 371 Date: Aug. 25, 2000

§ 102(e) Date: Aug. 25, 2000

(87) PCT Pub. No.: WO00/41289

PCT Pub. Date: Jul. 13, 2000

(30) Foreign Application Priority Data

Jan. 5, 1999 (DK) .......................... 1999 00015

(51) Int. Cl.[7] .............................. H02K 1/12; H02K 3/26; H02K 23/62

(52) U.S. Cl. ................ 310/254; 310/40 MM; 310/248; 310/249

(58) Field of Search ................ 310/44 MM, 254, 310/90, 42, 248, 249

(56) References Cited

U.S. PATENT DOCUMENTS

| | | | |
|---|---|---|---|
| 1,536,328 A | 5/1925 | Caruso | 310/237 |
| 1,655,286 A | 1/1928 | Nietsche | 310/40 R |
| 4,130,769 A | 12/1978 | Karube | 310/46 |
| 4,143,289 A | 3/1979 | Williams | 310/156.42 |
| 4,317,072 A | 2/1982 | Goof et al. | 318/138 |
| 4,445,061 A | 4/1984 | Jackson, Jr. | 310/156.08 |
| 4,468,580 A | 8/1984 | Sasaki et al. | 310/237 |
| 4,509,109 A | 4/1985 | Hansen | 310/126 |
| 4,547,713 A | 10/1985 | Langley et al. | 310/254 |
| 4,595,849 A | 6/1986 | Cuenoud | 310/36 |
| 4,667,123 A | 5/1987 | Denk et al. | 310/156.22 |
| 4,733,118 A | 3/1988 | Mihalko | 310/177 |
| 5,650,679 A | * 7/1997 | Boggs, III et al. | 310/105 |
| 5,710,474 A | 1/1998 | Mulgrave | 310/254 |

FOREIGN PATENT DOCUMENTS

| | | |
|---|---|---|
| DE | 33 20 555 A1 | 12/1984 |
| EP | 0 030 008 B1 | 6/1981 |
| EP | 0 491 929 B1 | 7/1992 |
| GB | 2 028 598 A | 3/1980 |
| WO | WO 91/11842 | 8/1991 |
| WO | WO 92/02068 | 2/1992 |
| WO | WO 93/05712 | 4/1993 |
| WO | WO 95/34934 | 12/1995 |
| WO | WO 98/11649 | 3/1998 |

OTHER PUBLICATIONS

Tiny Motors packed with precision published in Machine Design, Jul. 9, 1998, p. 58.

* cited by examiner

Primary Examiner—Karl Tamai
Assistant Examiner—Judson H. Jones
(74) Attorney, Agent, or Firm—Oliff & Berridge, PLC

(57) ABSTRACT

An electric miniature motor having a stator of magnetic soft material and a permanent magnet rotor. The stator has a low electrical conductivity at least in the direction of the rotor shaft to dampen eddy currents in the stator material caused by rotation of the rotor. The magnetizable material of the stator is composed of ring-shaped elements with two sections having their respective diameters so that the elements may be joined co-axially to a tubular stator. This provides the same eddy current damping properties as with a stator composed of segments, but the stator is much cheaper. The coils are formed as flat coils on a flexible foil which are arranged along the internal side of the stator.

7 Claims, 4 Drawing Sheets

ELECTRICAL MINIATURE MOTOR

TECHNICAL FIELD

The invention is thus based on high performance electric miniature motors. These are e.g. used in mobile telephones where a mass, which is mounted eccentrically on the shaft of the motor, upon rotation causes the mobile telephone to vibrate, whereby the user of the telephone is wirelessly made aware that there is an incoming call on the telephone. This illustrates a situation where the motor according to the invention may be used to advantage, and the example should not be taken to restrict the invention.

To provide a sufficiently high performance and speed for the motor, it is an advantage to use a permanent magnet as a rotor. This, however, normally causes problems in connection with motors of this size, since eddy current losses are created in the stator because of the rotating magnetic field that is established when the magnet rotates. In large motors, this problem is normally overcome by laminating the magnetic part of the housing/stator to the motor. Laminated magnetic cores are known for avoiding eddy current losses in magnetic cores in motors and transformers, etc., said core being composed of a plurality of individual sheets which are electrically insulated from each other at least partly, so that the stack of sheets has an at least significantly reduced electrical conductivity transversely to the planes of the sheets, that is in the direction of stacking.

In the field of high frequency technique it is known to use sintered magnetic elements of ferrite material.

DRAWBACKS OF THE PRIOR ART

The above solutions to the problem of eddy current losses in the stator of miniature motors have certain drawbacks. For example, lamination of the stator in an axial direction is rather expensive, since the stator of miniature motors has a very small wall thickness, and it adds considerably to the costs when the magnetic core of the stator has to be assembled from a plurality of small ring-shaped sheet elements with a sufficiently high precision.

The use of sintered elements is likewise inexpedient because of the necessary small thickness of material, since the stator hereby gets a too low ultimate strength, and also it is difficult to make a stator of a sintered material, such as ferrite, with sufficiently narrow tolerances.

A miniature motor of the above-mentioned type is known from an article or advertisement *Tiny motors packed with precision* published in *Machine Design*, Jul. 9, 1998, page 58. This motor, however, also has drawbacks. The motor uses a wound coil made by a process wherein the coil threads must be wound very closely together and be positioned with great precision because of the small size in order to achieve a suitably high performance in the very small and compact coil. A very high degree of precision is required for such a process, which makes the process cumbersome, and the resulting motor is therefore expensive.

Furthermore, this known motor has no commutator brushes. This requires additionally complicated and cost-increasing control electronics which is used for keeping track of and determining the angular position of the rotor relative to the stator coil, so that the correct part of the coil can be activated to affect the magnet expediently. The high speeds of rotation moreover make very great demands on the control electronics. An additional drawback of the use of the external control electronics is that the electronics per se takes up much space relative to the miniature motor. This manifests itself particularly in connection with mobile telephones where size, weight and price are very much competitive parameters.

OBJECT OF THE INVENTION

The object of the present invention is to provide a compact high performance miniature motor with a high speed of rotation, which also consists of simple components and is thereby easy and simple to manufacture.

SUMMARY OF THE INVENTION

The invention provides a high performance miniature motor with a low eddy current loss and containing quite few simple elements, such as bearings, a double-sided flexible circuit board provided with coil parts on both sides, a spring used as a commutator brush, a permanent magnet used as a rotor, etc. This allows a very simple and inexpensive manufacturing method for the motor.

The problem of eddy currents in the housing when the magnet rotates is solved in the following manner according to the invention.

In a preferred embodiment, the motor housing is formed by a plurality of non-plane subelements which are provided with protruding parts and corresponding cavities to receive protruding parts on another subelement so that the subelements have a self-centering effect when assembled. This means that the housing is essentially electrically insulating in the longitudinal direction of the motor, since, in practice, the division into subelements gives an electrical division into layers which, otherwise, can typically be achieved only by an expensive lamination, so that eddy current losses are avoided entirely or reduced considerably. The housing is still magnetically conductive, as is required for a stator in a motor.

According to a preferred embodiment, the electrical terminal wires are integrated on the flexible circuit board. This ensures an additionally simple and flexible structure, as the terminal wires do not have to be soldered on the coils, but have already been integrated. This gives an easy and inexpensive mounting of the motor in e.g. a mobile telephone.

In an expedient embodiment, the end part of the spring touching the commutator segments has a direction of winding opposite to the direction of rotation of the shaft. This ensures that the spring cannot inexpediently lose contact with the shaft, since the spring will be tightened additionally when the motor is used.

BRIEF DESCRIPTION OF THE DRAWINGS

The invention will be described more fully below with reference to the drawing, in which.

DETAILED DESCRIPTION OF THE INVENTION

Figures 1, 2:
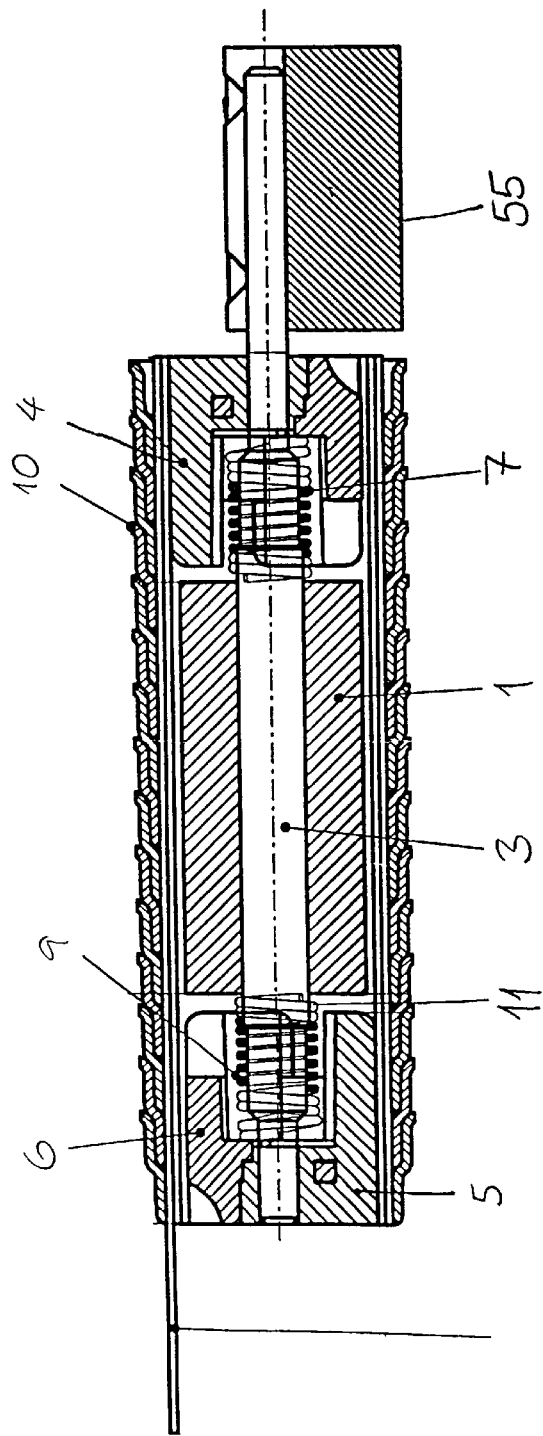
FIG. 1 shows a schematic section longitudinally through a motor according to a preferred embodiment of the invention.
FIG. 2 shows an element for building the stator in the motor in FIG. 1.

FIG. 1 shows a schematic section longitudinally through a motor according to a preferred embodiment of the invention. The motor comprises a stator (10) of magnetic soft material shaped as a substantially cylindrical tube which is composed of elements as shown in FIG. 2.

FIG. 2 shows an element (50) for building the stator in the motor in FIG. 1. The element (50) consists of magnetic soft material and has the shape of a ring or a short length of tube with two interconnected sections, a first section (51) and a second section (52). The first section (51) has an external diameter which corresponds to the internal diameter of the second section (52), so that the first section may be received in the second section on a second element with a suitable degree of friction.

When building a stator for the motor in FIG. 1, a suitable number of elements (50) are arranged on a mandrel where they are pressed together so that the narrow first sections (51) of the elements are pressed into the wide second sections (52) of the adjacent elements. This results in the formation of a tubular element which is used as a stator in a motor as shown in FIG. 1. The mandrel serves as an aid in the assembly and has the effect that the resulting stator is not curved, but rectilinear.

The stator is thus divided into individual parts separated in its longitudinal direction, which causes eddy current losses to be reduced significantly, thereby imparting a greater efficiency to the motor.

The elements (50) for building a stator are self-centering because they each have two sections which fit into each other and enclose each other at least partly. This self-centering effect may be achieved by other embodiments of the elements. For example, the elements may be shaped as a frusto-conical shell, or they may have projections on one side with corresponding cavities on the other side.

FIG. 1 also shows that one end of the shaft (3) has mounted thereon a mass (55) which is arranged eccentrically relative to the shaft.

Two bearings (4, 5) are provided at the ends of the stator (10), one bearing (5) of which serves as a commutator with commutator segments. Rotatably secured in the bearings (4, 5) is a shaft (3) with electrical connection to the bearing (4) through a screw spring (7) which is in constant electrical contact with the bearing (4) and thus serves as a slip-ring contact. The bearing (4) may be formed with an unbroken slip-ring or be identical with the bearing (5) at the opposite end with commutator segments. The advantages of this in terms of production are evident. Alternatively, the bearing (4) per se may be conductive and be made of known conductive materials for such bearings, such as bronze or conductive plastics, thereby obviating the spring (7). Fixedly mounted on the shaft (3) is a permanent magnet (1) which is magnetized in a radial direction and serves as a rotor. Further, an electrically conducting screw spring (9), which serves as a commutator brush, is mounted on the shaft (3). The spring (9) has an end part (11) which is pressed onto a part of the shaft which has a slightly increased diameter, whereby the spring (9) is kept in position on the shaft by its own mechanical tension. The contact springs (7, 9) have opposite directions of winding, but are otherwise identical.

Three commutator segments are provided on the bearing (5), of which only a single one (6) is visible in FIG. 1. The three commutator segments are placed with 120 degrees between each other, and by rotation of the shaft (3) the free end of the spring moves across the three commutator segments and make alternately contact with them individually. The motor may optionally have more than three commutator segments with their respective coils attached.

The electrical connection to the motor has one commutator brush and one slip-ring contact with permanent electrical contact, where other motors have two commutator brushes on the same commutator. The structure with just one commutator brush selected here is advantageous, because the wear on the commutator segments is thereby substantially halved, it being mainly the power interruptions that subject the metal parts of the commutator to wear. Moreover, this structure is advantageous, because also less electrical noise is generated hereby.

Figure 3:
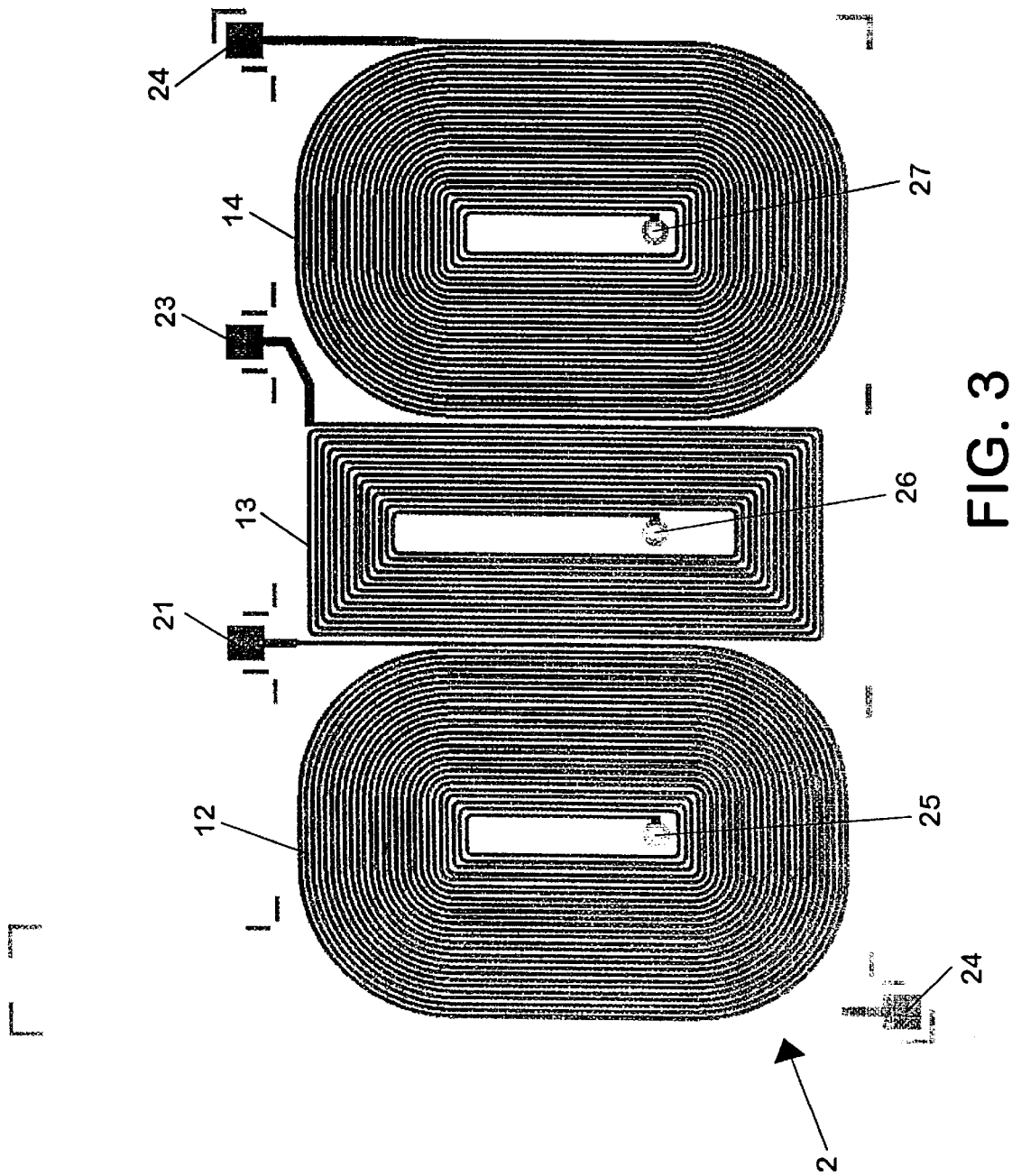
FIG. 3 shows a side (the front side) of a developed flexible circuit board according to an embodiment of the invention, FIG. 4, seen through one side, shows another side (the rear side) of a developed flexible circuit board according to an embodiment of the invention.
Figure 4:
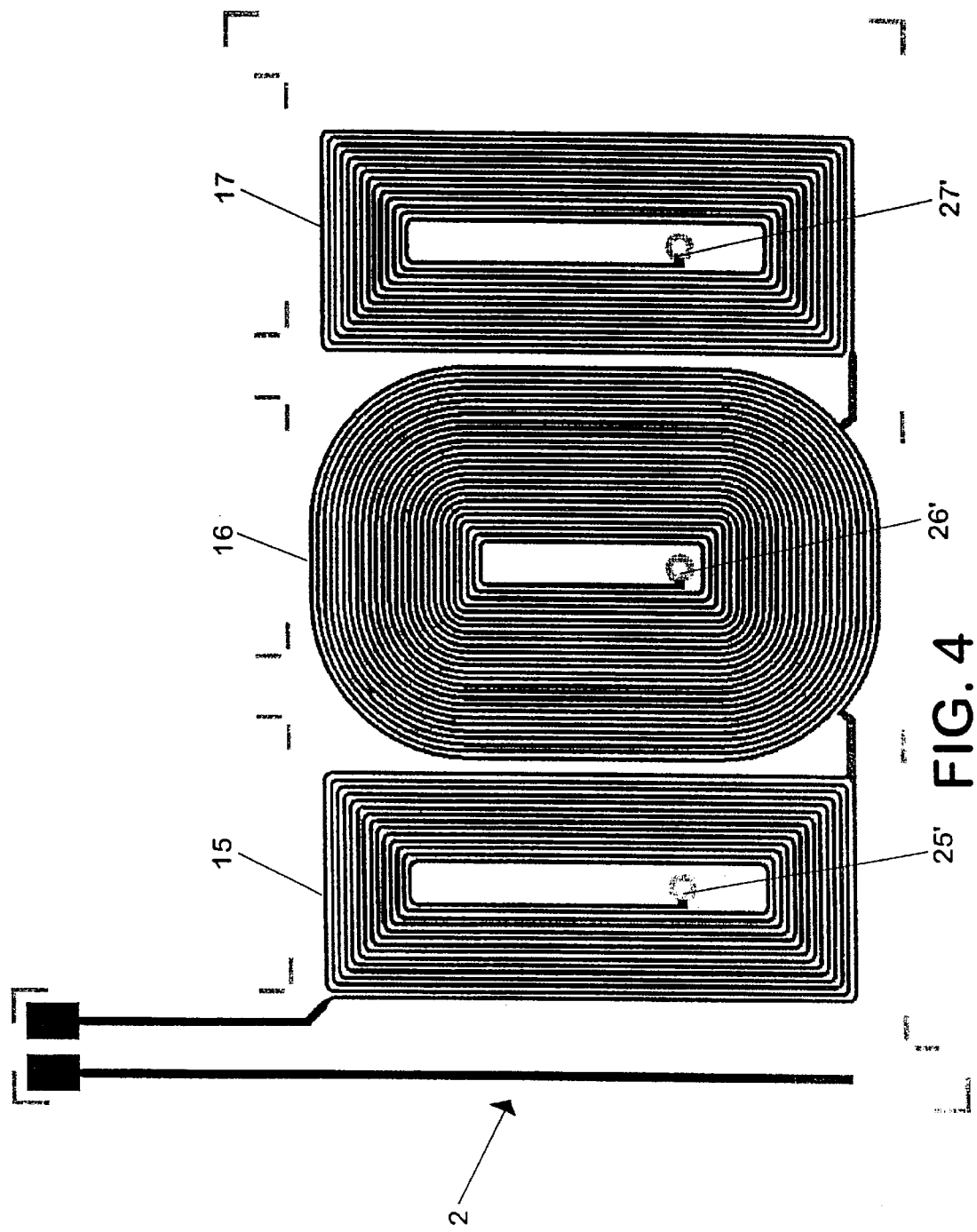

FIGS. 3–4 show a flexible circuit board (2) in the form of a flexible foil with coils that may be impressed or etched by means of prior art techniques. The commutator segments in the bearing (6) are each electrically connected to a coil (12, 15; 13, 16; 14, 17), on a flexible circuit board (2) in the form of a flexible foil with coils, through their respective connecting points. A positive voltage is applied to all the coils (12, 15; 13, 16; 14, 17) from a positive terminal wire (+) on the flexible circuit board (2), while a negative voltage (or earth) is applied to the shaft (3) via the electrically conducting bearing (4) through a connecting point between the electrical bearing (4) and a negative terminal wire (−) on the flexible circuit board (2). When the spring (9) touches a commutator segment, a current will flow in the coil concerned (12, 15; 13, 16; 14, 17) to which the commutator segment is electrically connected. The current will create a magnetic field in the longitudinally extending conductors of the coil concerned (12, 15; 13, 16; 14, 17), that is the parts which extend in an axial direction, and this magnetic field affects the magnet (1) by a force and causes rotation of the magnet (1) and thereby the shaft (3), the coils (12, 15; 13, 16; 14, 17) being secured relative to the housing.

When assembling the motor, the coiled-up flexible circuit board with coils is first inserted into the stator housing so that it engages and is held firmly against the inner wall of the housing because of the outwardly directed pressure from the coiled-up flexible circuit board. Then, a first bearing is secured by a simple axial movement for insertion into one end part of the housing, so that the flexible circuit board is additionally stretched and secured against the interior of the housing. The shaft with the magnet secured, i.e. the entire rotor, is positioned centrally in this bearing. A spring is pressed axially on the shaft, which spring is to serve as a commutator brush, e.g. so that it engages the magnet or is otherwise fixed axially. A second bearing provided with commutator segments is then moved axially into the other end part of the housing until electrical contact between the commutator brush and a commutator segment is detected. Then, the second bearing is pressed additionally into the motor housing (e.g. 0.1–0.2 mm) so that the spring is firmly fixed between the magnet and the second bearing. The latter pressure particularly ensures a well-defined contact force between the commutator brush and the commutator segments, thereby ensuring a good and stable electrical connection between the commutator segments and the shaft with minimum wear.

Preferably, the rotor with the spring (9), which touches the commutator segments with its end part, has a direction of rotation which means that friction between the spring (9) and the commutator segments causes further tightening of the spring.

FIG. 3 shows a side (the front side) of a developed flexible circuit board (2) according to an embodiment of the invention. The figure shows three subcoils (12, 13, 14) positioned on one side of the flexible circuit board (2). The subcoils (12, 13, 14) are connected through the connecting points (25, 26, 27) to their respective other subcoils (see FIG. 3 and the description below) which are present on the other side of the flexible circuit board (2). Each coil (12, 13, 14) has a connecting point (21, 22, 23) of its own to the respective connected commutator segment. A connecting point (24) ensures that the negative voltage (or earth) fed from the negative terminal wire (−) (see FIG. 4) is fed to the bearing (4).

The configuration of the subcoils (12, 13, 14) has been made with a view to utilizing the area of the flexible circuit board (2) as well as possible with respect to the number of windings on each coil. The flexible circuit board (2) is rolled into a cylinder with substantially two layers (they have a small overlap, see FIG. 5), so that the coil centres (25, 25'; 26, 26'; 27, 27') are mutually offset by substantially 120 degrees. The cylinder with the two layers gives a total of about 720 degrees on which the coils may be distributed. Each pair of coils has an extent in the peripheral direction corresponding to 240 degrees. The shown arrangement of the coils on the flexible circuit board means that each coil consists of a small subcoil and a large subcoil positioned on their respective sides of the flexible circuit board (2). The large coil part (12, 14, 16) for each coil must have a certain extent in the peripheral direction to enclose the magnet (1) sufficiently to cause rotation of this (see FIG. 4). This is satisfied particularly expediently by this invention in that each coil comprises a pair of coils with a large and a small subcoil, the large subcoils alternately being present on the one and the other side of the flexible circuit board. If the large subcoils were arranged on the same side of the flexible circuit board, there would not be sufficient space on the one side of the flexible circuit board while still maintaining two layers (with a small overlap). Thus, by positioning at least one subcoil on the other side space is provided for the rest of the large subcoils, while providing extra space that is utilized by the invention for the respective small coil part (13, 15, 17) in order to increase the effective number of windings for each coil, resulting in a greater effective capacity per coil. This gives a very high utilization ratio of the coil area on very restricted space.

FIG. 4, seen through one side, shows another side (the rear side) of a developed flexible circuit board. The figure shows three subcoils (15, 16, 17) which each are electrically connected to the three subcoils (12, 13, 14) on the other side of the flexible circuit board through the connecting points (30). Also visible are electrical terminal wires (+, −) which feed the coils with positive voltage and negative (optionally earth) voltage, respectively. The positive voltage from the positive terminal wire (+) is fed to all the coils through the connecting points. When the spring (9) touches one of the commutator segments, an electrical circuit is created, consisting of the positive terminal wire (+), the coil connected to the touched commutator segment, the touched commutator segment, the spring (9), the shaft (3), the spring (7), the bearing (4) and the negative terminal wire (−) through the connecting point. The current flowing in this circuit will create a magnetic field in the longitudinal conductors of the connected coil, which magnetic field affects the magnet (1) by a force and causes rotation of the magnet (1) and thereby the shaft (3), the coils (12, 15; 13, 16; 14, 17) and the flexible circuit board (2) being secured to the housing.

Alternatively, all six subcoils may be the same on both sides of the flexible circuit board so that each of the subcoils has an extent in the peripheral direction corresponding to 240 degrees.

Figure 5:
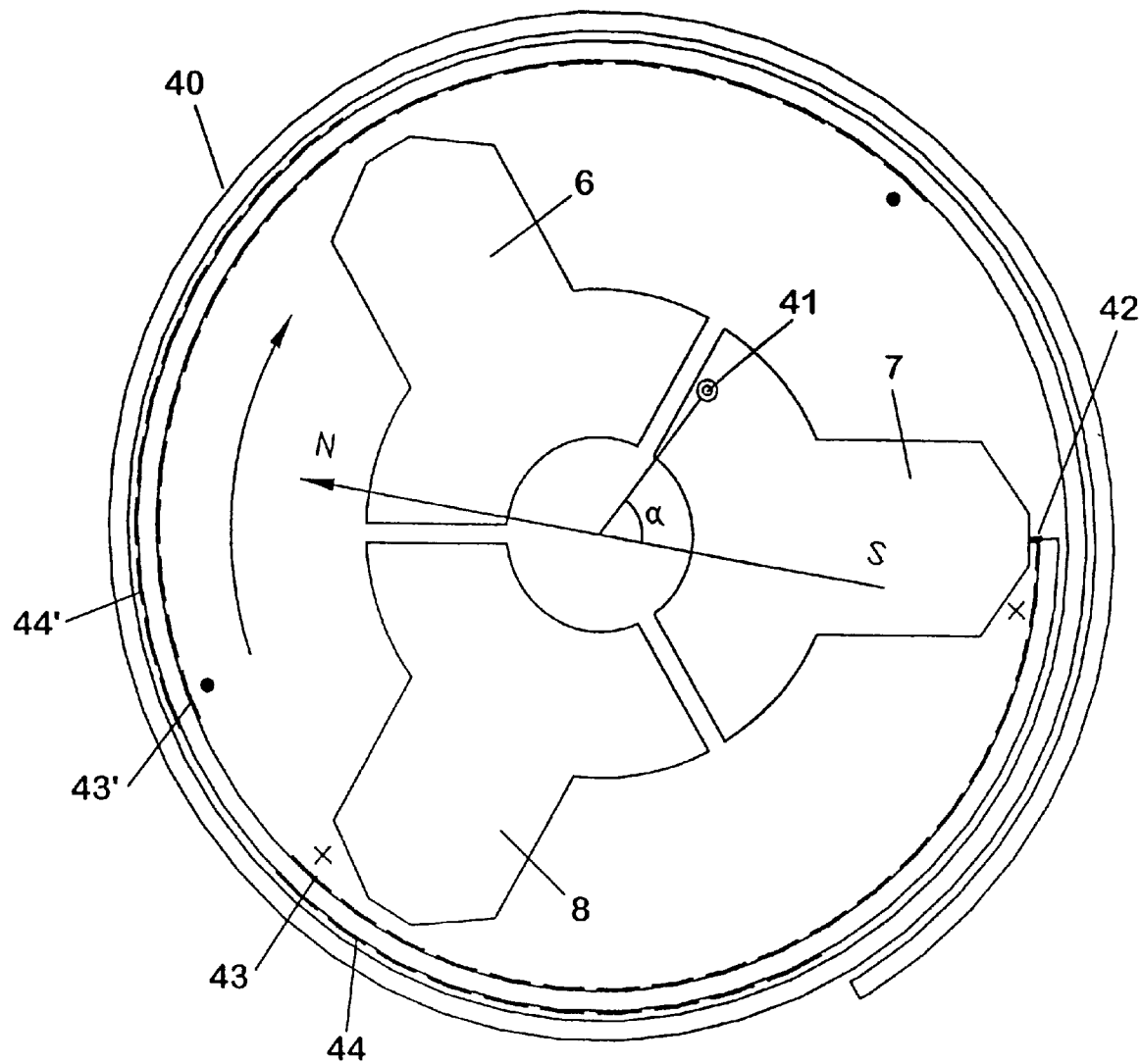
FIG. 5 shows a schematic section transversely trough a folded/coiled-up cylinder of a flexible circuit board as well as three commutator segments according to an embodiment of the invention, said cylinder being placed around the commutator segments.

FIG. 5 shows a schematic section transversely through a folded/coiled-up cylinder (40) of the flexible circuit board (2) and the three commutator segments according to an embodiment of the invention, the cylinder being positioned around the commutator segments. In the figure., (41) designates the contact point between the spring (9) and the active commutator segment. The active commutator segment is connected to its respective coil at the connecting point (42), which corresponds to the connecting point (23) in FIG. 3. The solid lines on the cylinder (40) schematically indicate the position of the conductors in the longitudinal direction in the coil. (43) and (43') designate the one half and the other half, respectively, of the large coil part of the coil positioned on one side of the flexible circuit board (2), while (44) and (44') designate the one half and the other half, respectively, of the large coil part of the coil positioned on the opposite side of the flexible circuit board (2). The figure also shows the angle α between the contact point (41) seen in relation to the centre of the shaft (not shown) and the direction of magnetization shown as the arrow from S and N. x and ● respectively indicate the current direction in and out of the plane.

The situation in FIG. 5 outlines for example an initial position/start position in which the shaft is at rest. If the voltage terminals (+, −) are activated, then, as stated above, there will be an electrical circuit consisting of the positive terminal wire (+), the coil (43, 43', 44, 44') connected to the touched commutator segment, the touched commutator segment, the spring (9), the shaft (3), the electrically conductive bearing (4) and the negative terminal wire (−) through the connecting point, and a current will flow in the coil (43, 43', 44, 44') as indicated by the current directions x and ●. At (43) and (44) the current in the conductors (which extend into the plane) and the magnetic field illustrated by the arrow from S and N will create a force which affects the conductors (43, 44) anti-clockwise. Since the conductors are secured to the housing (10), the shaft (3), on the contrary, will be affected by the conductors clockwise. At (43') and (44') the current goes out of the plane, and the conductors (43', 44') will be affected by a force anti-clockwise, which causes the shaft (3) to be affected clockwise since the conductors are secured to the housing (10). These two cooperating forces will thus rotate the shaft (3) clockwise, as indicated by the bent arrow. This force application will continue until the spring (9) no longer touches the commutator segment, and the electrical circuit is thereby interrupted. The moment of the shaft (3) and the magnet (1) will cause the shaft (3) to still move until the spring (9) touches the next commutator segment and a new electrical circuit is created, containing the next coil which is offset 120° relative to the preceding one. The current in the new electrical circuit and the magnetic field will now create a force in a manner similar to the one above, merely offset 120°, and will rotate the shaft (3) and the magnet (1) additionally. This process will repeat itself and the shaft will continue to rotate, until the voltage on the terminal wires (+, −) is no longer fed.

The two bearings (4, 5) of the motor are shaped as plugs that are inserted in an axial direction into the stator with parts of the flexible circuit board disposed between the bearings and the stator (10). Only the coil parts in which the conductive paths extend in the axial direction of the motor apply a moment of force to the magnet of the rotor, and these coil parts have the same extent in an axial direction as the magnet.

The parts of the conductive paths on the flexible circuit board which do not exclusively extend in the axial direction of the motor, are present outside the ends of the magnet and preferably between the bearing plugs and the stator. This position is particularly advantageous, since these conduction parts thereby do not take up space, and the motor can therefore be made particularly compact. At one end of the motor, electrical currents flow in these parts one way round in the peripheral direction, and at the other end of the motor, currents of the same magnitude flow the other way round. These currents will therefore balance each other so that, in operation, the rotor is not affected by any net force in an axial direction. This is an advantage, because the contact force is thereby just determined by the structure and not by the conditions of operation.

What is claimed is:

1. An electric motor comprising a stator with bearings for rotatably receiving a shaft, and with coils of electrically conducting wire for generating a magnetic field in the stator when an electrical current runs in the coils, each of said coils having a first wire end electrically connected to a first electrical terminal for the motor and a second wire end electrically connected to a contact face of its own, a rotor with a shaft which carries a permanent magnet, said shaft being arranged rotatably in the bearings of the stator such that the magnet cooperates with the magnetic field from the coils, said rotor carrying a contact brush with a first part in sliding, permanent electrical contact with a second electrical terminal for the motor, and a second part in sliding, alternating electrical contact with the contact faces by rotation of the rotor, characterized in that the second part of the contact brush is in sliding, permanent electrical contact with the second electrical terminal through the shaft which is electrically conducting and a bearing which is also electrically conducting.

2. A motor according to claim 1, characterized in that the contact brush is helical and encloses part of the shaft.

3. A motor according to claim 2, characterized in that one end of the contact brush is in electrical contact with the shaft, and that its other end is free and is in sliding, alternating electrical contact with the contact faces by rotation of the rotor.

4. A motor according to claim 1, characterized in that the coils are shaped as flat coils on a flexible foil arranged along the inner side of the cavity of the stator.

5. A motor according to claim 4, characterized in that the first wire ends of the coils on the foil are in electrical contact with respective commutator segments.

6. A motor according to claim 2, characterized in that the coils are shaped as flat coils on a flexible foil arranged along the inner side of the cavity of the stator.

7. A motor according to claim 3, characterized in that the coils are shaped as flat coils on a flexible foil arranged along the inner side of the cavity of the stator.

* * * * *